2,892,804

LIQUID COATING COMPOSITION OF METHYL METHACRYLATE POLYMER AND AN ORGANOPHILIC CATION-MODIFIED CLAY, AND PROCESS OF MAKING

Laverne W. Crissey, Penfield, Pa., assignor to E. I. du Pont de Nemours and Company, Wilmington, Del., a corporation of Delaware No Drawing. Application September 20, 1954
Serial No. 457,301

24 Claims. (Cl. 260—41)

This invention relates to liquid coating compositions and more particularly to craze-resistant coating compositions containing polymers of methyl methacrylate and articles coated therewith.

By the term "polymer of methyl methacrylate" and related terms as used herein, are meant homopolymers of methyl methacrylate, copolymers of methyl methacrylate and other materials copolymerizable therewith containing a major proportion of methyl methacrylate, or mixtures of such homopolymers and/or copolymers.

By the term "methyl methacrylate lacquer," as used herein for the sake of brevity, is meant a liquid coating composition containing a polymer of methyl methacrylate as the principal film-forming material. It may also contain conventional pigments and such conventional modifiers as plasticizers, inhibitors, dispersing agents, flow control agents and the like. When reference is made to coatings or films of methyl methacrylate lacquer, the term signifies dry coatings obtained by applying such liquid coating compositions to a suitable substrate and permitting or causing the coating to dry.

Methyl methacrylate lacquers have long been known. However, in addition to such problems as applying reasonably thick films of these compositions without encountering webbing or veiling during the spraying operation, the problem of crazing has prevented the full commercial utilization of methyl methacrylate lacquers. Crazing is characterized by the occurrence of minute shallow cracks at the surface of the dry coating when it is exposed to a liquid solvent, e.g., when it is patched or recoated with the same or a similar lacquer at normal painting temperatures (50°–90° F.). The resulting coating is unacceptable because of its apparent low gloss, roughness and non-uniform appearance.

The incorporation of plasticizer in methyl methacrylate lacquers reduces crazing, and with some plasticizers enough can be added to completely eliminate crazing. However, this is not a practical solution to the problem because, as the plasticizer content is increased, the thermoplasticity of the dry coating increases, i.e., the coating becomes softer and more susceptible to marring and showing the print marks of heavy objects placed thereon. When enough plasticizer has been added to prevent crazing, the coatings are too thermoplastic in comparison with conventional lacquers and enamels to be used for normal purposes, and they are less durable in outdoor service than similar products containing less plasticizer.

Therefore, the principal object of this invention is to improve methyl methacrylate lacquers with respect to crazing resistance without adversely affecting any other essential property, such as thermoplasticity or outdoor durability.

Another object is to provide articles coated with methyl methacrylate lacquers having improved crazing resistance, so that such articles may be refinished with the same or a similar lacquer without crazing as a result of solvents in the new coating attacking the old coating.

Other useful objects will appear as the description proceeds.

These objects are accomplished, in a preferred embodiment, by providing a liquid coating composition, which on drying yields a hard, adherent, craze-resistant coating, comprising a polymer of methyl methacrylate, solvent therefor, and 1–50% of organophilic ammonium cation-modified clay, based on the total weight of the non-volatile components, said ammonium cation having at least one alkyl substituent containing at least 10 carbon atoms in a straight chain.

Other coating compositions which represent preferred embodiments of this invention are those defined in the preceding paragraph which contain, in addition, one or more of the commonly used pigments for organic coating compositions and/or one or more of the commonly used plasticizers for polymers of methyl methacrylate.

The preferred coated articles of this invention are obtained by applying a coating composition as described above to a suitable substrate and causing it to dry.

The preferred organophilic ammonium cation-modified clays for use in this invention are such naturally occurring minerals as bentonites and montmorillonites, containing inorganic cations which are rather easily replaced by substituted ammonium ions of the type described above. The organophilic cation-modified clays may be prepared by reacting sodium, potassium, magnesium or similar type of bentonite-like clay with a substituted ammonium base salt, such as decyl ammonium chloride, whereby the decyl ammonium salt of the clay is formed. Alternatively, an acidic bentonite-like clay may be reacted with a substituted ammonium base, such as decyl amine, to produce the organophilic ammonium cation-modified clay. The resulting organophilic clays have the property of swelling to several times their original volume in the presence of relatively polar solvents.

In addition to these ammonium cation-modified clays, various other onium cation-modified clays are described in United States Patent 2,531,427, which issued November 28, 1950, to Ernst A. Hauser. Examples of such materials are, for instance, montmorillonites, bentonites, zeolites, attapulgites and the like, originally in the form of acidic clays or inorganic salts thereof, which have been converted into onium salts by reaction with an onium compound in which the onium radical is selected from the class consisting of ammonium, phosphonium, oxonium, sulfonium, selenonium, stannonium, arsonium, stibonium, telluronium and iodonium, and has at least one alkyl substituent containing at least 10 carbon atoms in a straight chain, e.g., onium radicals such as linoleyl (i.e., octadecadienyl) ammonium, lauryl (i.e., dodecyl) triphenyl phosphonium, didodecyl ethyl sulfonium, decyl triphenyl arsonium, decyl triphenyl stibonium, didodecyl-gamma pyronium which acts like oxonium, and didodecyl ethyl telluronium. These other onium cation-modified clays may be utilized in this invention in place of the ammonium cation-modified clays, although the latter are preferred.

The presence of an onium cation-modified clay, as described in the preceding paragraphs, in a methyl methacrylate lacquer increases the crazing resistance thereof without adversely affecting any other critical property, such as outdoor durability or thermoplasticity, i.e., susceptibility to print marks.

The following examples are illustrative of the principles and practice of this invention although it is not limited thereto. Unless otherwise indicated, the parts and percentages are by weight.

*Example 1*

A blue methyl methacrylate lacquer of this invention containing an organophilic ammonium cation-modified clay was prepared by mixing pigment dispersions, an ammonium cation-modified clay dispersion, plasticizer and a polymethyl methacrylate solution to form a uniform composition.

Methyl methacrylate lacquer: Parts by weight
Titanium dioxide dispersion _____ 115
Phthalocyanine blue dispersion _____ 19
Ammonium cation-modified clay dispersion __ 153
Polymethyl methacrylate solution _____ 321
Benzyl butyl phthalate plasticizer _____ 60
_____
668

The dispersions had the following compositions:

Titanium dioxide dispersion: Parts by weight
Titanium dioxide _____ 34.9
Copolymer of 98 parts of methyl methacrylate and 2 parts of methacrylic acid (molecular weight 69,000) _____ 17.4
Toluene _____ 17.6
Acetone _____ 7.5
Xylene _____ 22.6
_____
100.0

Phthalocyanine blue dispersion: Parts by weight
Phthalocyanine blue _____ 10.7
Homopolymer of methyl methacrylate (molecular weight 90,000) _____ 21.3
Toluene _____ 20.9
Acetone _____ 8.9
Xylene _____ 38.2
_____
100.0

Ammonium cation-modified clay dispersion: Parts by weight
Dimethyldioctadecyl ammonium bentonite ("Bentone" 34, National Lead Company) _ 8.85
Toluene _____ 88.50
Acetone _____ 2.65
_____
100.00

These dispersions were prepared by grinding the ingredients in conventional paint grinding equipment until a smooth uniform dispersion was produced.

The polymethyl methacrylate solution had the following composition:

Polymethyl methacrylate solution: Parts by weight
Homopolymer of methyl methacrylate (molecular weight 92,000) _____ 39.3
Toluene _____ 42.5
Acetone _____ 18.2
_____
100.0

Expressed in simplified form the methyl methacrylate lacquer of this example had the following composition:

| | Parts by Weight | Percentage by Weight |
|---|---|---|
| Ammonium cation-modified clay | 13.5 | 2.0 |
| Pigments | 42.0 | 6.3 |
| Polymers of methyl methacrylate | 150.0 | 22.5 |
| Solvents | 402.5 | 60.2 |
| Plasticizer | 60.0 | 9.0 |
| | 668.0 | 100.0 |

In this composition the ammonium cation-modified clay constituted 5% by weight of the total non-volatile components, i.e., all of the components except the solvents.

A portion of the methyl methacrylate lacquer of this example was thinned to spraying viscosity and was sprayed on a clean 4" x 12" steel panel in sufficient amount to produce a dry coating about 2.2 mils thick.

The coating was dried for 30 minutes at 180° F. to speed up the drying and produce a hard adherent coating. Drying at room temperature would have required 16–24 hours.

Since it is known that a methyl methacrylate lacquer which crazes at a low temperature when contacted with a solvent will not craze at some higher temperatures, the maximum temperature at which crazing occurs ("maximum crazing temperature") is useful in comparing the crazing tendencies of such lacquers. The lower this "maximum crazing temperature," the more craze resistant the product will be, i.e., it can be contacted with solvents, as in refinishing, over a wider range of normal temperatures without crazing.

The maximum crazing temperature of the lacquer of this example was determined as follows: The lid-engaging rim of a one-gallon cylindrical paint can was cut out so that the can could be filled brim-full of water to produce a convex meniscus on the surface. The panel was placed, coated side up, on the meniscus in such a manner that the top edge of the can supported the panel and the back of the panel was in contact with, and at the temperature of, the water. A drop of methyl ethyl ketone was placed on the lacquer surface and was permitted to evaporate. This was repeated with a second drop on the same spot. The spot was then examined for the minute surface cracks which characterize crazing. Temperatures between 55° and 90° F. in 5° increments were employed.

By this test it was determined that the dry film of the product of this example did not craze even at the lowest temperature, i.e., 55° F. The maximum crazing temperature was therefore recorded as <55° F.

An unmodified methyl methacrylate lacquer, which had the same composition except that it did not contain any onium cation-modified clay, had a maximum crazing temperature of 85–90° F.

The practical significance of these results is that an article coated with a methyl methacrylate lacquer containing a substantial amount of an onium cation-modified clay can be refinished at normal painting temperatures without crazing, whereas the refinishing of the unmodified lacquer not containing an onium cation-modified clay could be undertaken only at temperatures above about 90° F. to avoid crazing.

The effect of the clay additive on thermoplasticity or imprint resistance was tested by placing a swatch of open weave fabric on a panel coated with the lacquer of this example and a similar swatch on a panel coated with the same lacquer except that the clay additive was omitted, and covering each swatch with a weight in the manner described under Imprint Resistance in the eleventh edition (1950) of Gardner and Sward's "Physical and Chemical Examination; Paints, Varnishes, Lacquers, Colors," page 167. To hasten the effect, the tests were run for 1 hour at 150° F. The amount of imprint thus produced was exactly the same for both coatings by visual standards. This indicated that the clay additive did not have an adverse effect on thermoplasticity. In contrast, it is known that analogous coatings containing enough plasticizer to substantially improve crazing resistance are more thermoplastic and less imprint resistant.

It was further determined that the product of this example and other methyl methacrylate lacquers containing an onium cation-modified clay were at least equal in durability to analogous methyl methacrylate lacquers not containing such an additive by exposing coated metal panels outdoors in Florida.

*Examples 2–4*

Three additional methyl methacrylate lacquers were prepared and tested as described in Example 1, except that different proportions of the ammonium cation-modified clay were used in place of the 5% concentration employed in Example 1.

Example 2 contained approximately 2.5% of the ammonium cation-modified clay, by weight, based on the total non-volatile components, and had a maximum crazing temperature of 75–80° F.

Examples 3 and 4 contained approximately 7.5% and 10% of the clay, respectively, on the same basis and had maximum crazing temperatures of <55° F.

All three were at least equal in imprint resistance and durability to the unmodified methyl methacrylate lacquer which did not contain any of the clay additive.

*Example 5*

Another methyl methacrylate lacquer was prepared as in Example 1 using 7.5% of 18 carbon atom alkyl ammonium cation-modified clay ("Bentone" 18C, National Lead Company), by weight, of the total non-volatile components, and had a maximum crazing temperature of <55° F.

*Example 6*

The following is a simplified formula for another methyl methacrylate lacquer of this invention, which has the same composition as the product of Example 1 except for the onium cation-modified clay:

| | Parts by Weight | Percentage by Weight |
|---|---|---|
| Sulfonium cation-modified clay (didodecyl ethyl sulfonium bentonite) | 13.5 | 2.0 |
| Pigments | 42.0 | 6.3 |
| Polymers of methyl methacrylate | 150.0 | 22.5 |
| Solvents | 402.5 | 60.2 |
| Plasticizer | 60.0 | 9.0 |
| | 668.0 | 100.0 |

The following Examples 7–9 describe, in abbreviated terms, other methyl methacrylate lacquers of this invention which contain onium cation-modified clay, and which provide improved crazing resistance without adversely affecting imprint resistance and outdoor durability.

*Example 7*

A yellow methyl methacrylate lacquer having the following composition was prepared as in Example 1.

| | Parts by weight |
|---|---|
| Chrome yellow dispersion | 814 |
| Ammonium cation-modified clay dispersion | 515 |
| Polymethyl methacrylate solution | 156 |
| Benzyl butyl phthalate | 100 |
| | 1585 |

The dispersions had the following compositions:

Chrome yellow dispersion:

| | Parts by weight |
|---|---|
| Chrome yellow medium | 26.0 |
| Polymethyl methacrylate solution | 43.0 |
| Xylene | 31.0 |
| | 100.0 |

Ammonium cation-modified clay dispersion:

| | Parts by weight |
|---|---|
| Dimethyldioctadecyl ammonium bentonite | 9.9 |
| Polymethyl methacrylate solution | 28.3 |
| Xylene | 61.8 |
| | 100.0 |

The polymethyl methacrylate solution had the following composition:

Polymethyl methacrylate solution:

| | Parts by weight |
|---|---|
| Homopolymer of methyl methacrylate (molecular weight 92,000) | 42.0 |
| Toluene | 40.6 |
| Acetone | 17.4 |
| | 100.0 |

Expressed in simplified form, the methyl methacrylate lacquer of this example had the following composition:

| | Parts by Weight | Percentage by Weight |
|---|---|---|
| Ammonium cation-modified clay | 51 | 3.2 |
| Pigments | 212 | 13.4 |
| Polymer of methyl methacrylate | 274 | 17.3 |
| Solvents | 948 | 59.8 |
| Benzyl butyl phthalate | 100 | 6.3 |
| | 1,585 | 100.0 |

In this composition the ammonium cation-modified clay constituted 8% by weight of the total non-volatile components.

*Example 8*

A polychromatic green lacquer of this invention has the following composition:

| | Parts by Weight | Percentage by Weight |
|---|---|---|
| Dimethyldioctadecyl ammonium salt of montmorillonite | 33 | 2.4 |
| Colloidal hydrous iron oxide | 8 | 0.6 |
| Phthalocyanine green | 16 | 1.1 |
| Aluminum flake pigment | 7 | 0.5 |
| Homopolymer of methyl methacrylate (molecular weight 85,000) | 388 | 27.7 |
| Solvents | 792 | 56.6 |
| Dibutyl phthalate | 156 | 11.1 |
| | 1,400 | 100.0 |

In this composition the ammonium cation-modified clay constitutes about 5.5% by weight of the total non-volatile components.

*Example 9*

A bronze lacquer embodying this invention has the following composition:

| | Parts by Weight | Percentage by Weight |
|---|---|---|
| Dimethyldioctadecyl ammonium bentonite | 5 | 1.9 |
| Bronze powder (Pale Gold 6611, United States Bronze Powder Works) | 10 | 3.8 |
| Homopolymer of methyl methacrylate (molecular weight 83,000) | 71 | 27.0 |
| Solvents | 148 | 56.3 |
| Benzyl butyl phthalate | 29 | 11.0 |
| | 263 | 100.0 |

In this composition the ammonium cation-modified clay constitutes about 4.3% by weight of the total non-volatile components.

*Example 10*

A clear lacquer of this invention has the following composition:

| | Parts by Weight | Percentage by Weight |
|---|---|---|
| Dimethyldioctadecyl ammonium bentonite | 26 | 3.1 |
| Homopolymer of methyl methacrylate (molecular weight 92,000) | 250 | 29.5 |
| Solvents | 472 | 55.6 |
| Benzyl butyl phthalate | 100 | 11.8 |
| | 848 | 100.0 |

In this composition the ammonium cation-modified clay constituted about 7% by weight of the total non-volatile components.

Any of the above-described onium cation-modified clays or mixtures thereof may be substituted in equivalent amounts for the specific clays shown in the examples.

A preferred onium cation is ammonium, a further preferred onium cation is quaternary or tetra-substituted ammonium, and a specifically preferred onium cation is dimethyl dioctadecyl ammonium.

The preferred clays are bentonites and montmorillonites.

While as little as 1% by weight of onium cation-modified clay, based on the total non-volatile components, i.e., all of the components except the solvents, is effective in improving the crazing resistance of methyl methacrylate lacquers, about 2% is usually needed to produce an improvement of practical significance. As much as about 50% of onium cation-modified clay, on the same basis, may be employed without adversely affecting the important properties of the liquid lacquer or the dry coating thereof. The preferred amount of onium cation-modified clay is 2–10% by weight of the total non-volatile components of the methyl methacrylate lacquer.

The onium cation-modified clay may be incorporated in the lacquers of this invention by a variety of methods, such as by addition to a solution of a polymer of methyl methacrylate accompanied by vigorous mixing, by addition to a lacquer solvent or solvent mixture accompanied by vigorous mixing, or by grinding in the presence of similar media in conventional paint grinding equipment. Grinding is preferred, and this can conveniently be done either in the presence or absence of other pigments.

It is to be understood that, although a polymer of methyl methacrylate is the principal and essential film-forming constituent of these compositions, minor proportions of other well-known film-forming constituents may be incorporated to impart further desirable properties, such as varying degrees of hardness or flexibility, to the products. Obviously such film-forming materials must be compatible with the other constituents of the composition. Examples of such film-forming materials are, for instance, polymers and copolymers of vinyl esters, polymers and copolymers of acrylic esters other than the essential polymer of methyl methacrylate, oil-modified alkyd resins, natural resins and nitrocellulose.

It is to be understood that the particular pigments, solvents, diluents and plasticizers used in the examples are merely illustrative of a wide variety of such materials which may be used and which are well known to those skilled in the organic coating art.

A polymer of methyl methacrylate may be prepared by polymerizing methyl methacrylate monomer, with or without another monomer copolymerizable therewith, in bulk, in solution or in granular form to produce polymers having a wide range of molecular weight. Polymers having a molecular weight of about 55,000 to 105,000 are readily soluble in a wide variety of common and relatively inexpensive solvents and are preferred in the practice of this invention because they are sprayable at high solids without webbing. Coating compositions containing such polymers are disclosed and claimed in the copending application of Crissey and Lowell, Serial No. 402,498, filed January 6, 1954.

The molecular weight values, referred to herein, are on the basis of weight average molecular weight and calculated from the equation $$M = 1.47 \times 10^6 (N_r - 1 - 1nN_r)^{0.65}$$

in which M is the molecular weight and $N_r$ is the value of the fraction (A)  efflux time of polymer solution
(B)  efflux time of solvent used in polymer solution The efflux times are measured in accordance with the procedure of ASTM–D–445–46T Method B using, as the "oil" mentioned in said procedure, (A) a solution of 0.25 gram of the methyl methacrylate polymer being tested in 50 cc. of ethylene dichloride, and (B) a sample of the ethylene dichloride used in making said solution, respectively. The determinations are run at 25° C. in a modified Ostwald viscosimeter, series 50.

By this method the preferred polymers of methyl methacrylate employed in this invention have $N_r$ (relative viscosity) values between 1.117 and 1.196, which correspond to calculated molecular weight values of 55,000 and 105,000, respectively.

A variety of polymers of methyl methacrylate are disclosed in the foregoing examples. The homopolymers are especially useful. An especially useful copolymer is described in Example 1. Other useful copolymers include copolymers of methyl methacrylate with a minor proportion, e.g., 2–25% of another material copolymerizable therewith, for instance, acrylic and methacrylic acids, the $C_1$–$C_4$ alkyl esters of acrylic acid, the $C_2$–$C_4$ alkyl esters of methacrylic acid, vinyl acetate, acrylonitrile, and styrene.

The specific polymers employed in the examples may be replaced partly or wholly by similar amounts of any of the polymers of methyl methacrylate described immediately above.

Examples of useful pigments are, for instance, iron blues, organic reds and maroons, silica, talc, china clay and metallic oxides, silicates, chromates, sulfides and sulfates.

Examples of useful volatile solvents and diluents are, for instance, aliphatic, cycloaliphatic and aromatic hydrocarbons, esters, ethers, ketones and alcohols.

Many well-known plasticizers for polymers of methyl methacrylate may be employed in the compositions of this invention. However, the particular plasticizer used affects the physical properties of the resulting coating, including cracking, crazing, flexibility and durability. The preferred plasticizer is benzyl butyl phthalate, because it imparts the best overall balance of properties, and especially the crack-resistance. Other plasticizers which will produce films having especially desirable properties are dibutyl phthalate, triphenyl phosphate, 2-ethyl hexyl benzyl phthalate and dicyclohexyl phthalate. Oter well-known plasticizers for polymers of metyl methacrylate which may be employed include diallyl phthalate, dibenzyl phthalate, butyl cyclohexyl phthalate, mixed benzoic acid and fatty oil acid esters of pentaerythritol, poly (propylene adipate) dibenzoate, diethylene glycol, dibenzoate, tetrabutyl-thiodisuccinate, butyl phthalyl butyl glycolate, acetyl tributyl citrate, dibenzyl sebacate, tricresyl phosphate, toluene ethyl sulfonamide, the di 2-ethyl hexyl ester of hexamethylene diphthalate, and di(methyl-cyclohexyl) phthalate. Plasticizers are normally employed in amounts of about 10–50% by weight based on the weight of the polymer of methyl methacrylate.

Other well-known modifying agents for organic coating compositions may be incorporated to alter the manufacturing, storage, application or service properties of the compositions of this invention, such as soya lecithin, silicone fluids, triethanolamine, fatty oil acids and glyceride oil derivatives.

The products of this inventon may be applied to a wide variety of substrates, such as wood, glass and metal, by any well-known application method, such as spraying, dipping or brushing. Although the coatings may be air-dried, the drying period can be minimized by baking. The resulting coatings may be rubbed or polished, if desired, to impart further smoothness and/or higher apparent gloss.

The products are most useful as coatings which are occasionally patched or refinished, which are not easily marred by imprints, and which are durable in outdoor service. For these reasons the products are particularly useful as top coat finishes for application to suitably primed automobile bodies.

It is apparent that many widely different embodiments of this invention may be made without departing from the spirit and scope thereof; and, therefore, it is not intended to be limited except in accordance with the appended claims.

I claim:
1. A liquid coating composition which on drying yields a hard, adherent craze-resistant coating, comprising a polymer of methyl methacrylate as the major film-forming constituent, solvent therefor, and 1–50% of organophilic cation-modified clay, based on the total weight of the non-volatile components, said polymer of methyl methacrylate being a member of the group consisting of homopolymers of methyl methacrylate, copolymers of methyl methacrylate and another material copolymerizable therewith containing a major proportion of polymerized methyl methacrylate, and mixtures of such homopolymers and copolymers, said other material being a member of the group consisting of methacrylic acid, a 1–4 carbon alkyl ester of acrylic acid, a 2–4 carbon alkyl ester of methacrylic acid, vinyl acetate, acrylonitrile and styrene, and said cation being an onium radical of the class consisting of ammonium, phosphonium, oxonium, sulfonium, selenonium, stannonium, arsonium, stibonium, telluronium and iodonium, and having at least one alkyl substituent containing at least 10 carbon atoms in a straight chain.

2. The coating composition of claim 1, in which the organophilic cation-modified clay comprises 2–10% by weight of the non-volatile components.

3. The coating composition of claim 1, in which the clay is a bentonite.

4. The coating composition of claim 1, in which the clay is a montmorillonite.

5. The coating composition of claim 1, in which the onium radical is ammonium.

6. The coating composition of claim 1, in which the organophilic cation-modified clay is a dimethyldioctadecyl ammonium salt of bentonite.

7. The coating composition of claim 1, in which the organophilic cation-modified clay is a dimethyldioctadecyl ammonium salt of montmorillonite.

8. The coating composition of claim 1 containing a pigment.

9. The coating composition of claim 1 containing a plasticizer.

10. The coating composition of claim 1, in which the polymer of methyl methacrylate has a molecular weight of 55,000–105,000.

11. The coating composition of claim 1, in which the polymer of methyl methacrylate is a homopolymer.

12. The coating composition of claim 1, in which the polymer of methyl methacrylate is a copolymer of methyl methacrylate and a minor proportion of other material copolymerizable therewith.

13. The coating composition of claim 1, in which the polymer of methyl methacrylate is a copolymer of methyl methacrylate and a minor proportion of a member of the group consisting of acrylic acid, methacrylic acid, the 1–4 carbon atom alkyl esters of acrylic acid, the 2–4 carbon atom alkyl esters of methacrylic acid, vinyl acetate, acrylonitrile and styrene.

14. The coating composition of claim 1, in which the polymer of methyl methacrylate is a copolymer of methyl methacrylate and a minor proportion of methacrylic acid.

15. The coating composition of claim 1, in which the polymer of methyl methacrylate is a mixture of a homopolymer of methyl methacrylate and a copolymer of methyl methacrylate and a minor proportion of another material copolymerizable therewith.

16. The process of improving the craze-resistance of a liquid coating composition containing a polymer of methyl methacrylate as the major film-forming constituent, a dry coating of which composition crazes when contacted with a solvent for said polymer, which process comprises incorporating in said liquid coating composition 1–50% of organophilic cation-modified clay, based on the total weight of the non-volatile components, said polymer of methyl methacrylate being a member of the group consisting of homopolymers of methyl methacrylate, copolymers of methyl methacrylate and another material copolymerizable therewith containing a major proportion of polymerized methyl methacrylate, and mixtures of such homopolymers and copolymers, said other material being a member of the group consisting of methacrylic acid, a 1–4 carbon alkyl ester of acrylic acid, a 2–4 carbon alkyl ester of methacrylic acid, vinyl acetate, acrylonitrile and styrene, and said cation being an onium radical of the class consisting of ammonium, phosphonium, oxonium, sulfonium, selenonium, stannonium, arsonium, stibonium, telluronium and iodonium, and having at least one alkyl substituent containing at least 10 carbon atoms in a straight chain.

17. The process of claim 16, in which the onium radical is ammonium.

18. The process of claim 16, in which the organophilic cation-modified clay is a dimethyldioctadecyl ammonium salt of bentonite.

19. The process of claim 16, in which the organophilic cation-modified clay is a dimethyldioctadecyl ammonium salt of montmorillonite.

20. The process of claim 16, in which the polymer of methyl methacrylate is a homopolymer.

21. The process of claim 16, in which the polymer of methyl methacrylate is a copolymer of methyl methacrylate and a minor proportion of other material copolymerizable therewith.

22. The process of claim 16, in which the polymer of methyl methacrylate is a copolymer of methyl methacrylate and a minor proportion of a member of the group consisting of acrylic acid, methacrylic acid, the 1–4 carbon atom alkyl esters of acrylic acid, the 2–4 carbon atom alkyl esters of methacrylic acid, vinyl acetate, acrylonitrile and styrene.

23. The process of claim 16, in which the polymer of methyl methacrylate is a copolymer of methyl methacrylate and a minor proportion of methacrylic acid.

24. A coated article having a hard, adherent, craze-resistant top coat of the coating composition of claim 1.

References Cited in the file of this patent

UNITED STATES PATENTS

| | | |
|---|---|---|
| 2,078,808 | Reardon | Apr. 27, 1937 |
| 2,367,880 | Lindh | Jan. 23, 1945 |
| 2,597,872 | Iler | May 27, 1952 |
| 2,634,244 | Simm et al. | Apr. 7, 1953 |

OTHER REFERENCES

"Synthetic Resins and Rubbers," by Powers, published 1943, by John Wiley and Sons, pages 155–156.